US008951329B2

(12) United States Patent
Lanin et al.

(10) Patent No.: US 8,951,329 B2
(45) Date of Patent: Feb. 10, 2015

(54) PRODUCTION OF VALVE METAL POWDERS WITH IMPROVED PHYSICAL AND ELECTRICAL PROPERTIES

(75) Inventors: Leonid Lanin, Belmont, MA (US); Anastasia M. Conlon, Canton, MA (US); Michael J. Albarelli, Milton, MA (US)

(73) Assignee: H.C. Starck GmbH (DE)

( * ) Notice: Subject to any disclaimer, the term of this patent is extended or adjusted under 35 U.S.C. 154(b) by 1680 days.

(21) Appl. No.: 11/629,540

(22) PCT Filed: Jun. 21, 2005

(86) PCT No.: PCT/US2005/021659
§ 371 (c)(1),
(2), (4) Date: Dec. 13, 2006

(87) PCT Pub. No.: WO2006/012076
PCT Pub. Date: Feb. 2, 2006

(65) Prior Publication Data
US 2007/0180952 A1 Aug. 9, 2007

Related U.S. Application Data

(60) Provisional application No. 60/582,579, filed on Jun. 24, 2004.

(51) Int. Cl.
*B22F 9/20* (2006.01)
*B22F 1/00* (2006.01)
*H01G 9/052* (2006.01)

(52) U.S. Cl.
CPC ............ *B22F 1/0007* (2013.01); *B22F 1/0088* (2013.01); *B22F 1/0096* (2013.01); *B22F 9/20* (2013.01); *H01G 9/0525* (2013.01); *B22F 2998/00* (2013.01)
USPC .................................. 75/359; 75/369; 419/66

(58) Field of Classification Search
USPC ........... 75/343, 363, 366, 369, 613, 614, 622, 75/623; 432/118; 419/30–32
See application file for complete search history.

(56) References Cited

U.S. PATENT DOCUMENTS

| 4,483,819 | A | 11/1984 | Albrecht et al. .................. 419/2 |
| 5,605,561 | A * | 2/1997 | Iwabuchi et al. ................ 75/364 |
| 5,954,856 | A * | 9/1999 | Pathare et al. ................... 75/255 |
| 6,193,779 | B1 | 2/2001 | Reichert et al. |
| 6,238,456 | B1 * | 5/2001 | Wolf et al. ....................... 75/245 |
| 6,558,447 | B1 * | 5/2003 | Shekhter et al. ................ 75/252 |
| 6,849,104 | B2 * | 2/2005 | Shekhter et al. ................ 75/351 |
| 7,354,472 | B2 * | 4/2008 | Shekhter et al. ................ 75/351 |
| 2002/0066338 | A1 * | 6/2002 | Shekhter et al. ................ 75/245 |

FOREIGN PATENT DOCUMENTS

| WO | WO-00/15555 | 3/2000 |
| WO | WO-00/67936 | 11/2000 |

OTHER PUBLICATIONS

J. Grzella et al, "Metallurgical Furnaces", in Ullmann's Encyclopedia of Industrial Chemistry, Wiley-VCH Verlag GmbH & Co., published Jan. 15, 2003, 47 pages.*

* cited by examiner

*Primary Examiner* — George Wyszomierski
(74) *Attorney, Agent, or Firm* — Drinker Biddle & Reach LLP

(57) ABSTRACT

The invention relates to a process that involves (1) feeding (a) a first valve metal powder component containing valve metal particles and (b) reducing component into a reactor having a hot zone; and (2) subjecting the first valve metal powder component and the reducing component to non-static conditions sufficient to simultaneously (i) agglomerate the first valve metal powder component particles, and (ii) reduce oxygen content in the valve metal powder component particles, and thereby form a second valve metal powder component containing oxygen-reduced valve metal particles, in which the reducing component is selected from the group consisting of magnesium reducing components, calcium reducing components, aluminum reducing components, lithium reducing components, barium reducing components, strontium, reducing components, and combinations thereof.

26 Claims, No Drawings

PRODUCTION OF VALVE METAL POWDERS WITH IMPROVED PHYSICAL AND ELECTRICAL PROPERTIES

CROSS-REFERENCE TO RELATED APPLICATIONS

This application is a national stage entry of, and claims the benefit of, Application No. PCT/EP2005/021659, filed Jun. 21, 2005. Application No. PCT/EP2005/021659 claims the benefit of U.S. Application No. 60/582,579, filed Jun. 24, 2004.

BACKGROUND

There has been a long felt need in the art to develop processes for making metal powders having improved surface areas, improved bulk densities, improved flowability and improved average particle diameters.

Unfortunately, it has been discovered that processes such as those described in U.S. Pat. No. 4,483,819 produce powders having reduced the surface area (capacitance) of powders.

It would be desired to develop a process that overcomes the deficiencies of known processes.

SUMMARY OF THE INVENTION

The invention relates to a process that involves (1) feeding (a) a first valve metal powder component containing valve metal particles and (b) reducing component into a reactor having a hot zone; and (2) subjecting the first valve metal powder component and the reducing component to non-static conditions sufficient to simultaneously (i) agglomerate the first valve metal powder component particles, and (ii) reduce oxygen content in the valve metal powder component particles, and thereby form a second valve metal powder component containing oxygen-reduced valve metal particles, in which the reducing component is selected from the group of magnesium reducing components, calcium reducing components, aluminum reducing components, lithium reducing components, barium reducing components, strontium, reducing components, and combinations thereof.

In one embodiment, the invention relates to the powder made in accordance to such a process.

The invention also relates to a process that involves (1) feeding (a) a first valve metal powder component containing valve metal particles having an oxygen content that is more than about 1 wt. % and (b) a reducing component into a reactor having a tube containing a hot zone and having an angle ranging from about 0.1 to about 100, relative to the horizontal axis of the tube; and (2) rotating, tumbling and dropping the first valve metal powder component and the reducing component at a temperature that is at least about 670° C. under continuous conditions sufficient to simultaneously (i) agglomerate the first valve metal powder component particles, and (ii) reduce oxygen content in the first valve metal powder component particles, and thereby form a second valve metal powder component containing oxygen-reduced valve metal particles having (i) a surface area that is at least about the same, or more, than the surface area of the particles of the first valve metal powder component, (ii) a bulk density that is more than the bulk density of the first valve metal powder component particles, and (iii) a flowability that is more than the first valve metal powder particles. The reducing component is selected from the group of magnesium reducing components, calcium reducing components, aluminum reducing components, lithium reducing components, barium reducing components, strontium reducing components, and combinations thereof.

These and other features, aspects, and advantages of the present invention will become better understood with reference to the following description and appended claims.

DESCRIPTION

The invention is based on the remarkable discovery that by using subjecting a valve metal powder component and a reducing component to non-static conditions, it is possible to obtain powders having improved properties, as compared to powders made under static conditions.

Generally, the process of the invention (1) feeds (a) a first valve metal powder component containing valve metal particles and (b) reducing component into a reactor having a hot zone; and (2) subjects the first valve metal powder component and the reducing component to non-static conditions sufficient to simultaneously (i) agglomerate the first valve metal powder component particles, and (ii) reduce oxygen content in the valve metal powder component particles, and thereby form a second valve metal powder component containing oxygen-reduced valve metal particles.

The first valve metal powder component is selected from the group of hafnium, niobium, titanium, tantalum, zirconium, molybdenum, tungsten, hafnium alloys, niobium alloys, titanium alloys, tantalum alloys, zirconium alloys, molybdenum alloys, tungsten alloys, and combinations thereof.

The reducing component is selected from the group of magnesium reducing components, calcium reducing components, aluminum reducing components, lithium reducing components, barium reducing components, strontium reducing components, and combinations thereof. In one embodiment, the reducing component is selected from the group of solid magnesium components, liquid magnesium, gaseous magnesium, and combinations thereof.

The reactor used to practice the process can be any reactor, which when used in accordance to the invention, enables the production of powders having improved properties. In one embodiment, the reactor is a tube having at least one baffle for tumbling or mixing the first valve metal powder component. The tube has a rotating speed which can vary. In one embodiment, the tube rotates at a speed ranging from about 0.25 rpm to about 10 rpm. Examples of suitable reactors that can be used include those reactors named indirect-heat rotary kiln or calcining furnaces, available from Harper International, HED International, Thermal Processing Solutions, Inc.

The reducing component and the first valve metal powder component can be fed into a reactor by any suitable means. In one embodiment, the reducing component and the first valve metal powder component are fed into the reactor separately with two separate feeders. In another embodiment, the first valve metal powder component and the reducing component are fed into the reactor in a blended powder component that is made by blending the first valve metal powder component and the reducing component before the reducing component and the first valve metal powder component are fed into the reactor.

The first valve metal powder component can be introduced into the reactor at various feed rates. In one embodiment, the first valve metal powder component is introduced into the reactor at a feed rate ranging from about 1 to about 100 kg/h and the tube has a diameter ranging from about 10 cm to about 200 cm. In one embodiment, the reducing component is a magnesium reducing component, and the magnesium reducing component is introduced into the reactor, based on oxygen content of the first valve metal powder component, with an excess of magnesium reducing component ranging from 0 to about 10% of the stoichiometrical amount, such that (i) the feed rate ranges from about 0.01 to about 10 kg/hour, (ii) the tube diameter ranges from about 10 cm to about 200 cm and the reactor has a hot zone (or zones) with a length ranging from about 90 cm to about 3500 cm.

It is critical that the first valve metal powder be subjected to non-static conditions. The non-static conditions are selected from the group of tumbling, dropping, rotation, and combinations of the foregoing.

The temperature at which the first valve metal powder and the second valve metal powder component are subjected to vary. In one embodiment, the first valve metal powder component and the second valve metal powder component are subjected to non-static conditions at a temperature ranging from about 670° C. to about 1500° C.

The oxygen-reduced valve metal particles of the second valve metal powder component have useful properties. In one embodiment, the oxygen-reduced valve metal particles of the second valve metal powder component have a flowability that is at least about 0.5 grams/second. In another embodiment, the oxygen-reduced valve metal particles of the second valve metal powder component have a flowability ranging from about 0.2 grams/second to about 2.5 grams/second. In another embodiment, the oxygen-reduced valve metal particles of the second valve metal powder component comprises particles having a flowability ranging from about 20% to about 100% more, or more, than the flowability of particles of the first valve metal powder component.

The bulk density of the properties of the oxygen-reduced valve metal powders of the second valve metal powder component can vary. In one embodiment, the oxygen-reduced valve metal particles of the second valve metal powder component have a bulk density ranging from about 10 to about 100% more, or more, than the valve metal particles of the first valve metal powder component.

The second valve metal powder component contains oxygen-reduced valve metal particles having a wide range of capacitances. In one embodiment, the second valve metal powder component contains oxygen-reduced valve metal particles having a capacitance ranging from about 40 to about 200 μF·V/g.

In one embodiment, the second valve metal powder component contains oxygen-reduced valve metal particles having an oxygen:surface ratio ranging from about 0.25 to about 0.34 parts per million of oxygen/per $cm^2$.

Advantageously, the surface area of the oxygen-reduced valve metal particles of the second valve metal powder component is higher than the surface area of the valve metal particles of the first valve metal powder component. In one embodiment, the oxygen-reduced valve metal particles have a surface area that is more than about 50% the surface area of the first valve metal powder component. In another embodiment, the oxygen-reduced valve metal particles have a surface area ranging from about 10 to about 150% more, or more, than the surface area of the particles of the first valve metal powder component.

The oxygen-reduced valve metal particles having an oxygen content that is less than the oxygen content of the starting powder. Generally, the oxygen-reduced valve metal particles have an oxygen content ranging from 10%, 20%, 30%, 40%, or more, less than the oxygen content of the first valve metal powder. In one embodiment, the oxygen-reduced valve metal particles have an oxygen content ranging from about 30% to about 80% less than the oxygen content of the first valve metal powder component. In one embodiment, the oxygen-reduced valve metal particles have a uniform particle distribution.

In one embodiment, the second valve metal powder component contains oxygen-reduced valve metal particles meeting one or more of the following conditions: (i) a surface area that is at least about the same, or more, than the surface area of the particles of the first valve metal powder component, (ii) a bulk density that is more than the bulk density of the first valve metal powder component particles, (iii) a flowability that is more than the first valve metal powder particles, (iv) an average particle diameter that is higher than the average particle diameter of the first valve metal powder component particles, as compared to the drop in surface area of as to when the first valve metal powder component is subjected to static conditions.

In another embodiment, when the first valve metal powder component contains particles having an oxygen content that is greater than about 1 wt %, In one embodiment more than about 1.5 wt %, the second valve metal powder component contains oxygen-reduced valve metal particles meeting one or more of the following conditions: (i) a surface area that is less than the surface area of the particles of the first valve metal powder component, (ii) a bulk density that is more than the bulk density of the first valve metal powder component particles, (iii) a flowability that is more than the first valve metal powder particles, and (iv) an average particle diameter that is higher than the average particle diameter of the first valve metal powder component.

In use, the process of the process of the invention is carried out under a wide range conditions. For instance, in one embodiment, the process is carried out in an inert gas selected from the group of argon, helium, and neon, such that the flow of the inert gas is in the same direction of the first valve metal powder component is fed into the reactor. The inert gas has a flow rate that ranges widely. In one embodiment, the flow rate ranges from about 0.05 to about 5 standard cubic feed/hour per $inch^2$ of tube diameter. In one embodiment, the inert gas pressure inside the reactor must be in the range from about 1 to about 10 inch of water column.

In one preferred embodiment, the process involves (1) feeding (a) a first valve metal powder component containing valve metal particles having an oxygen content that is more than about 1 wt. % and (b) a reducing component into a reactor having a tube containing a hot zone and having an angle ranging from about 0.1 to about 10°, relative to the horizontal axis of the tube; and (2) rotating, tumbling and dropping the first valve metal powder component and the reducing component at a temperature that is at least about 670° C. under continuous conditions sufficient to simultaneously (i) agglomerate the first valve metal powder component particles, and (ii) reduce oxygen content in the first valve metal powder component particles. The process thereby forms a second valve metal powder component containing oxygen-reduced valve metal particles having (i) a surface area that is at least about the same, or more, than the surface area of the particles of the first valve metal powder component, (ii) a bulk density that is more than the bulk density of the first valve metal powder component particles, and (iii) a flowability that is more than the first valve metal powder particles, such that the reducing component is selected from the group of magnesium reducing components, calcium reducing components, aluminum reducing components, lithium reducing components, barium reducing components, strontium, reducing components, and combinations thereof.

The powders made in accordance to the invention can be used for various purposes. In one embodiment, the powders are used to make capacitors. Such a capacitor can involve a capacitor including a sintered second valve metal powder component valve metal powder, in which the powder is made by a process that (a) feeds (1) a first valve metal powder component containing valve metal particles having an oxygen content that is more than about 1 wt. % and (2) a reduces component into a reactor having a tube containing a hot zone and having an angle ranging from about 0.1 to about 10°, relative to the horizontal axis of the tube; and (b) rotates, tumbles and drops the first valve metal powder component and the reducing component at a temperature that is at least about 670° C. under continuous conditions sufficient to simultaneously (i) agglomerate valve metal particles of the first valve metal component and (ii) reduce oxygen content in the first valve metal powder component particles, and thereby form a second valve metal powder component containing oxygen-reduced valve metal particles, such that the oxygen-reduced valve metal particles have (i) a surface area that is at least about the same, or more, than the surface area of the particles of the first valve metal powder component, (ii) a bulk density that is more than the bulk density of the first valve metal powder component particles, and (iii) a flowability that is more than the first valve metal powder particles; and in which the reducing component is selected from the group of magnesium reducing components, calcium reducing components, aluminum reducing components, lithium reducing components, barium reducing components, strontium, reducing components, and combinations hereof.

The process can contain additional steps. In one embodiment, the process further includes collecting the second valve metal powder component in a container, cooling the second valve metal powder component to ambient temperature, and thereby subjecting the second valve metal powder component to passivation or gradually exposing the cooled second valve metal powder component to air, unloading the second valve metal powder component, and leaching the second valve metal powder component in a mineral acid solution Although the present invention has been described in detail with reference to certain preferred versions thereof, other variations are possible. Therefore, the spirit and scope of the appended claims should not be limited to the description of the versions contained therein.

What is claimed is:

1. A process comprising:
   (1) feeding (a) valve metal particles and (b) a reducing component into a reactor having a hot zone; and
   (2) subjecting the valve metal particles and the reducing component to non-static conditions sufficient to simultaneously (i) agglomerate the valve metal particles, and (ii) reduce oxygen content in the valve metal particles, and thereby form a valve metal powder containing oxygen-reduced valve metal particles,
   wherein the non-static conditions are selected from the group consisting of tumbling, dropping, rotation, and combinations of the foregoing;
   wherein the reducing component is selected from the group consisting of magnesium reducing components, calcium reducing components, aluminum reducing components, lithium reducing components, barium reducing components, strontium reducing components, and combinations thereof; and
   wherein the oxygen-reduced valve metal particles have a surface area ranging from about 10 to about 150% more than the surface area of the valve metal particles prior to being subjected to non-static conditions.

2. The process of claim 1, wherein the oxygen-reduced valve metal particles exhibit one or more of the following:
   (i) a surface area that is at least about the same as, or more than, the surface area of the valve metal particles prior to being subjected to non-static conditions,
   (ii) a bulk density that is more than the bulk density of the valve metal particles prior to being subjected to non-static conditions,
   (iii) a flowability that is greater than that of the valve metal particles prior to being subjected to non-static conditions,
   (iv) an average particle diameter that is higher than the average particle diameter of the valve metal particles prior to being subjected to non-static conditions.

3. The process of claim 1, wherein the valve metal particles prior to being subjected to non-static conditions have an oxygen content that is greater than about 1 wt %, and
   the oxygen-reduced valve metal particles exhibit one or more of the following:
   (i) a surface area that is less than the surface area of the valve metal particles prior to being subjected to non-static conditions,
   (ii) a bulk density that is more than the bulk density of the valve metal particles prior to being subjected to non-static conditions,
   (iii) a flowability that is greater than that of the valve metal particles prior to being subjected to non-static conditions,
   (iv) an average particle diameter that is higher than the average particle diameter of the valve metal particles prior to being subjected to non-static conditions.

4. The process of claim 1, wherein the reducing component and the valve metal particles are fed into the reactor separately with two separate feeders.

5. The process of claim 1, wherein the valve metal particles and the reducing component are fed into the reactor in as a blended powder component that is made by blending the valve metal particles and the reducing component before the reducing component and the valve metal particles are fed into the reactor.

6. The process of claim 1, wherein the valve metal particles are comprised of a metal selected from the group consisting of hafnium, niobium, titanium, tantalum, zirconium, molybdenum, tungsten, hafnium alloys, niobium alloys, titanium alloys, tantalum alloys, zirconium alloys, molybdenum alloys, tungsten alloys, and combinations thereof.

7. The process of claim 1, wherein the reducing component is selected is selected from the group consisting of solid magnesium components, liquid magnesium, gaseous magnesium, and combinations thereof.

8. The process of claim 1, wherein the oxygen-reduced valve metal particles have a flowability that is at least about 0.5 grams/second to about 2.5 grams/second.

9. The process of claim 1, wherein the oxygen-reduced valve metal particles comprise particles having a flowability ranging from about 20% to about 100% more than the flowability of the valve metal particles prior to being subjected to non-static conditions.

10. The process of claim 1, wherein the oxygen-reduced valve metal particles have a bulk density ranging from about 10 to about 100% more than the valve metal particles prior to being subjected to non-static conditions.

11. The process of claim 1, wherein the oxygen-reduced valve metal particles have a surface area that is at least about 50% more than the surface area of the valve metal particles prior to being subjected to non-static conditions.

12. The process of claim 1, wherein the reactor comprises a tube having at least one baffle for tumbling or mixing the valve metal particles.

13. The process of claim 12, wherein the valve metal particles are introduced into the reactor at a feed rate ranging from about 1 to about 100 kg/h and the tube has a diameter ranging from about 10 cm to about 200 cm.

14. The process of claim 12, wherein the reducing component is a magnesium reducing component, and the magnesium reducing component is introduced into the reactor, based on oxygen content of the valve metal particles, with an excess of magnesium reducing component ranging from 0 to about 10% of the stoichiometrical amount,
   wherein (i) the feed rate ranges from about 0.01 to about 10 kg/hour, (ii) the tube diameter ranges from about 10 cm to about 200 cm and the reactor has a hot zone with a length ranging from about 90 cm to about 3500 cm.

15. The process of claim 1, wherein the valve metal particles and the reducing component are subjected to non-static conditions at a temperature ranging from about 670° C. to about 1500° C.

16. The process of claim 1, wherein the reactor is a tube rotating at a speed ranging from about 0.25 rpm to about 10 rpm.

17. The process of claim 16, wherein the reactor is at an angle ranging from about 0.1 to about 10°, relative to the horizontal axis of the tube.

18. The process of claim 1, wherein the reactor has a tube with a hot zone and the valve metal particles and the reducing component are held in the hot zone of the reactor for a residence time ranging from about 15 minutes to about 10 hours, at an angle ranging from about 0.1 to about 10°, relative to the horizontal axis of the tube, and the reactor rotates at a speed ranging from about 0.25 rpm to about 10 rpm.

19. The process of claim 1, wherein the oxygen-reduced valve metal particles have an oxygen content ranging from about 30% to about 80% less than the oxygen content of the valve metal particles prior to being subjected to non-static conditions.

20. The process of claim 1, wherein the oxygen-reduced valve metal particles have a uniform particle distribution.

21. The process of claim 1, wherein the process further comprises collecting the oxygen-reduced valve metal particles in a container, cooling the oxygen-reduced valve metal particles to ambient temperature, and thereby subjecting the oxygen-reduced valve metal particles to passivation or gradually exposing the cooled oxygen-reduced valve metal particles to air, unloading the oxygen-reduced valve metal particles, and leaching the oxygen-reduced valve metal particles in a mineral acid solution.

22. The process of claim 1, wherein the oxygen-reduced valve metal particles have a capacitance ranging from about 40 to about 200 mFV/g.

23. The process of claim 1, wherein the oxygen-reduced valve metal particles have an oxygen:surface ratio ranging from about 0.25 to about 0.34 parts per million of oxygen/$cm^2$.

24. The process of claim 1, wherein the process is carried out under an inert gas selected from the group consisting of argon, helium, and neon, and the flow of the inert gas is in the same direction that the valve metal particles are fed into the reactor.

25. The process of claim 1, wherein the inert gas has a flow rate ranging from about 0.05 to about 5 standard cubic feet/hour per $inch^2$ of tube diameter and inert gas pressure inside the reactor ranges from about 1 to about 10 inches of water column.

26. A process comprising:
   (1) feeding (a) valve metal particles having an oxygen content that is more than about 1 wt. % and (b) a reducing component into a reactor having a tube containing a hot zone and having an angle ranging from about 0.1 to about 10°, relative to the horizontal axis of the tube; and
   (2) rotating, tumbling and dropping the valve metal particles and the reducing component at a temperature that is at least about 670° C. under continuous conditions sufficient to simultaneously (i) agglomerate the valve metal particles, and (ii) reduce oxygen content in the valve metal particles, and thereby form oxygen-reduced valve metal particles having (i) a surface area that is more than the surface area of the valve metal particles prior to being subjected to non-static conditions, (ii) a bulk density that is more than the bulk density of the valve metal particles prior to being subjected to non-static conditions, and (iii) a flowability that is more than that of the valve metal particles prior to being subjected to non-static conditions;
   wherein the reducing component is selected from the group consisting of magnesium reducing components, calcium reducing components, aluminum reducing components, lithium reducing components, barium reducing components, strontium reducing components, and combinations thereof.

* * * * *